Patented Mar. 5, 1946

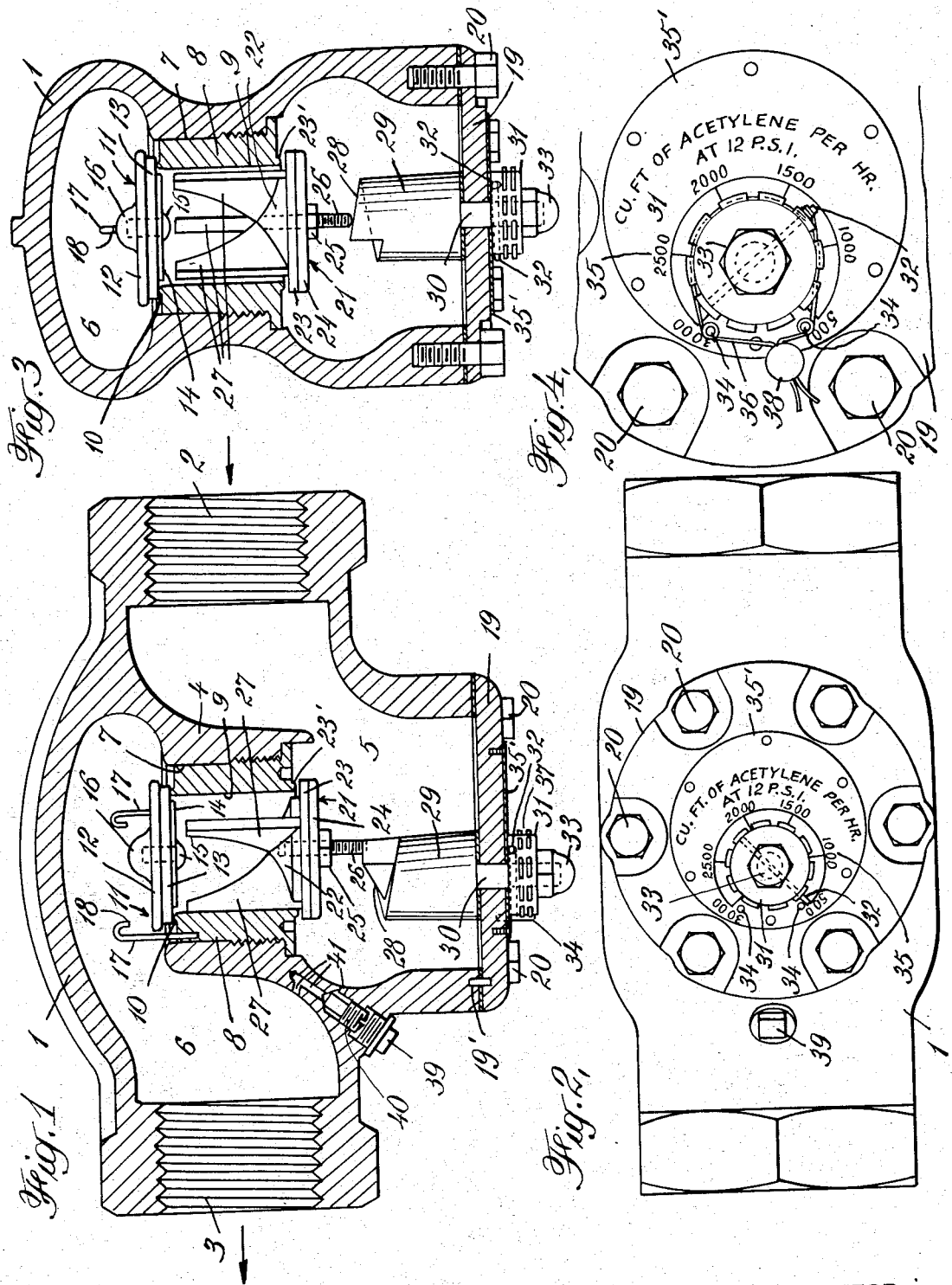

2,396,037

UNITED STATES PATENT OFFICE 2,396,037

DOUBLE-ACTING CHECK VALVE

Conrad de K. Bliss, Norwood, N. J., assignor to Air Reduction Company, Incorporated, a corporation of New York Application June 29, 1943, Serial No. 492,708

2 Claims. (Cl. 251—131)

This invention relates to improvements in double-acting check valves of the general type disclosed in the patent to G. M. Deming, No. 2,183,709. Such valves are adapted to check excessive forward flow and all back flow through a fluid supply line and find their principal use in the acetylene lines of oxyacetylene cutting and welding apparatus.

It is important to stop all reverse flow in an acetylene line as a precaution against back flow of oxygen and acetylene from the torch toward the acetylene generator or cylinders and as a precaution against flashbacks. There are a number of reasons for preventing excessive forward flow. Perhaps the most important one is that if a hose breaks, or if most of the resistance to the forward flow of acetylene is removed through some other accident, the flow of gas should be immediately shut off to prevent an explosion or fire at the region where the gas is escaping. A few other reasons why it is desirable to prevent excessive forward flow are the following: If the acetylene is being withdrawn from storage cylinders an excessive flow causes some of the acetone to be drawn off with the gas and this, of course, is objectionable. If the acetylene is being supplied by a generator an excessive flow, if long continued, will result in overheating or overloading of the generator. Moreover, an excessive rate of flow in one line will cause a pressure drop in other lines.

Valves of the type disclosed in the above-mentioned patent have a valve element opening in the direction of the gas flow and adapted to be closed by reverse flow of the gas, and another valve element opening against the gas flow and which is normally open to permit forward flow of the gas, but is adapted to close when the velocity of the forward flow becomes sufficient to move the valve. It is usually necessary to design a different valve for each condition of flow because the valve element which prevents excessive forward flow always closes at a predetermined gas velocity and no provision is made for causing it to close at a different gas velocity. Moreover, the valve element which prevents reverse flow is usually not sufficiently sensitive and quick-acting to stop some of the flame from passing back through the valve in the event of a flashback, and it is therefore customary to place a water seal on the torch side of the valve to check flame propagation.

In accordance with this invention means are provided for adjusting the valve element which prevents excessive forward flow so that it can be made to close at different gas velocities. Moreover, the valve element which prevents reverse flow is made so light and so sensitive in its operation that it will effectively check flame propagation in the event of a flashback and thus eliminate the necessity for using the above-mentioned water seal. Certain other novel features are provided as will hereinafter appear.

A double-acting check valve embodying the improvements is illustrated in the accompanying drawing, in which:

Figure 1 is a longitudinal section through the valve;

Fig. 2 is a bottom plan view of the valve shown in Fig. 1;

Fig. 3 is a transverse vertical section through the center of the valve shown in Fig. 1; and Fig. 4 shows a portion of Fig. 2 drawn to an enlarged scale to illustrate the means that may be employed for locking and sealing the adjusting means for the valve element that prevents excessive forward flow.

The valve comprises a housing 1 having an inlet 2 and an outlet 3. A partition 4 divides the interior of the housing into two compartments—an inlet compartment 5 and an outlet compartment 6. The partition 4 has an opening 7 into which a bushing 8 is adapted to be screwed. This bushing has a central passage 9 which places the compartments 5 and 6 in communication with each other when the valve elements hereinafter described are open.

The upper end of the bushing 8 has a valve seat 10 for a valve element 11 which constitutes the check valve for preventing reverse flow of gas through the valve. This check valve has a metal disc 12 against which a soft rubber face 13 is clamped by means of a plate 14 and a screw 15. The metal disc 12 may have a thickened portion 16 to receive the end of the screw, as best shown in Figs. 1 and 2. The marginal portion of the soft rubber face 13 is adapted to contact with the seat 10. The valve element 11 has no stem and this reduces its weight. It is guided by pins 17 inserted in the bushing 8 and spaced 120° apart. The upper end of each pin is bent inwardly as shown at 18 to overlie the disc 12 of the valve element. The pins therefore constitute a cage-like structure within which the valve element is guided and retained. The pins are inserted in the bushing before the bushing is screwed into the partition 4. It will be noted that all of the parts carried by the upper end of the bushing are such that they do not interfere with insertion of the bushing into the opening 7 and therefore they may all be assembled on the bushing before the bushing is screwed into place. The bushing may be inserted in the housing 1 through an opening that is closed by a cover plate 19 fastened to the housing by screws 20. Although the cover plate is substantially circular there is a stud 19' carried by the housing or by the cover plate and adapted to fit in a hole in the other part to insure that the cover plate is always put on in the same position.

The valve element which prevents excessive forward flow, usually called a "lock-up valve" is shown at 21. It is made up of a top casting 22, a rubber disc 23 and a bottom plate 24. The rubber disc is clamped between the casting 22 and the plate 24 by means of a nut 25 on a threaded stud 26 which passes through the plate 24 and is threaded into the casting 22.

On the casting 22 there are three vanes 27 spaced 120° apart. They have considerable length in the direction of the longitudinal axis of the bushing 8 and their outer edges bear against the inner cylindrical wall of the bushing. The vanes therefore guide the lock-up valve 21 and serve the function of a valve stem.

The lower end of the stud 26 contacts with a spirally arranged cam surface 28 at the upper end of a cam 29. A stem 30 at the lower end of the cam extends through the cover plate 19. A knob 31 is slipped over the end of the stem 30 and is prevented from turning on the stem by a pin 32 which extends through an opening in the stem and through a slot or recess extending across the inner face of the knob. A cap nut 33 is screwed onto the end of the stem 30 and bears against the knob. The friction with which the cam 29 turns may be adjusted by turning the cap nut 33 to press the knob 31 to a more or less degree against the outer surface of the cover plate 19.

One end of the pin 32 extends beyond the periphery of the knob 31 and is adapted to strike one or the other of two studs 34 (Figs. 2 and 4) to limit the amount that the knob can be turned in either direction. The projecting portion of the pin 32 also serves as a pointer and cooperates with a scale 35 on a thin plate 35' secured to the outer face of the cover plate 19. The scale numbers represent different rates of flow of gas through the valve and may express the rate of flow in cubic feet of gas per hour as shown in the drawing, or in any other suitable way.

The lock-up valve 21 is normally open as shown in the drawing and closes in the direction of normal gas flow through the housing. When closed by excessive gas velocity its rubber disc 23 bears against a seat 23' at the lower end of the bushing 8 to stop the forward gas flow. The velocity of gas flow necessary to move the lock-up valve against the seat 23' depends among other things on how far from the seat the lock-up valve is located when in open position. This is determined by the angular position of the cam 29. The position of the lock-up valve is adjusted so that the valve will close at a predetermined gas velocity by turning the knob 31 until the pin 32 points to the number on the scale corresponding to the rate of flow of the gas at which the lock-up valve should close. This turns the cam 29 and the cam surface 28 to change the position of the lock-up valve until it is such a distance from its seat that it will close when the rate of flow of gas through the valve corresponds approximately to the number on the scale to which the pin has been turned. On any particular acetylene line the lock-up valve is adjusted to close at a given gas velocity and that adjustment is not usually changed unless the cylinder bank is increased or a generator of greater capacity is provided or other generators are added. Therefore in order to prevent unauthorized adjustment of the lock-up valve it may be locked in adjusted position by means of a wire 36 (Fig. 4) which is passed through a hole in one of the studs 34 and wrapped several times around this stud, then passed circumferentially around the knob in a groove 37 provided for this purpose, then wrapped several times around the projecting end of the pin 32 at the set position of the pin, then passed around the remainder of the circumference of the knob, and finally passed through a hole in the other stud 34 and wrapped several times around this stud. The ends of the wire are embedded in a lead sealing disc 38. This makes it impossible to turn the knob and change the setting of the lock-up valve without removing the seal or breaking the wire. However, the wire may be easily removed when authorized readjustment of the valve is desired. One case where readjustment of the valve may be necessary even though the capacity of the acetylene source has not been increased is where the lock-up valve is adjusted to close at a flow slightly greater than the maximum demand on the particular line being served and other outlets are then added or the maximum demand is otherwise increased. It may then be desirable to readjust the lock-up valve to close at a higher gas velocity to take care of the increased demand.

To release the lock-up, i. e., to restore the lock-up valve to open position after it closes, all outlets at the downstream side of the double-acting check valve are closed. A plug 39 is then removed from the housing and this permits access to a needle valve 40. The needle valve may be turned, as by means of a screw driver, to open communication between the inlet and outlet compartments 5 and 6 of the housing through a by-pass passage 41. The needle valve is opened until pressure on both sides of the partition 4 is equalized sufficiently for the lock-up valve to open. The valve element 11 does not seat tightly enough to prevent pressure from building up in the space between the two valve elements to the extent necessary to permit the lock-up valve to open.

It will now be seen that a double-acting check valve having a lock-up valve which may be adjusted to close at different gas velocities as above described can be used at any one of a number of locations simply by adjusting the lock-up valve to suit the conditions at that location, and it is not necessary to design a different valve for every condition of flow.

Since the back-flow check valve 11 has no stem it is of light weight and it is so designed that it is of large area in proportion of its weight. It therefore closes quickly in response to the pressure wave that precedes the flame front in the case of a flashback. The surface that comes against the seat, being rubber, is soft and therefore the valve does not bounce back when it hits the seat. With previous fast closing metal check valves flames have sometimes been able to pass the valve because even if it closes promptly in response to the pressure wave it might bounce away from the seat just as the flame front reaches the valve. The back-flow check valve herein described closes before the flame front reaches the valve and remains closed to effectively prevent passage of flames beyond it. This makes it possible to eliminate the use of the water seal usually employed to prevent the flames from reaching the back-flow check valve.

I claim:

1. A valve comprising a housing having a gas inlet and outlet, a passage within the housing through which gas entering said inlet must flow upwardly to reach said outlet, a normally open valve element adapted to close said passage, a valve seat with which the valve element cooperates, said valve element being arranged to close in the direction of normal gas flow through said passage and adapted to be closed by the flow of gas when it exceeds a predetermined velocity, and means for adjusting the distance of said valve element from its seat to vary the gas velocity at which the valve element will close, said means comprising a cam within said housing which is rotatable about an axis disposed in the same direction as that in which said valve element moves and has a spirally arranged cam surface engaging a part on said valve element, and means outside of said housing for adjusting the cam.

2. A valve comprising a housing having a gas inlet and outlet, a passage within the housing through which gas entering said inlet must flow upwardly to reach said outlet, a normally open valve element adapted to close said passage, a valve seat with which the valve element cooperates, said valve element being arranged to close in the direction of normal gas flow through said passage and adapted to be closed by the flow of gas when it exceeds a predetermined velocity, and means for adjusting the distance of said valve element from its seat to vary the gas velocity at which the valve element will close, said means comprising a rotatable cam within said housing acting on the valve element, and a rotatable knob located outside of the valve housing and operatively connected to the cam for rotating the same.

CONRAD DE K. BLISS.